United States Patent
Lee, Jr. et al.

(10) Patent No.: US 6,282,566 B1
(45) Date of Patent: Aug. 28, 2001

(54) SYSTEM AND METHOD FOR A DEBIT CARD TELECOM SERVICE

(75) Inventors: Charles C. Lee, Jr., Plano, TX (US); Jeff J. Desando, Bolingbrook, IL (US); Scott D. Mock, San Antonio, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 08/918,382

(22) Filed: Aug. 26, 1997

Related U.S. Application Data

(60) Provisional application No. 60/048,227, filed on May 30, 1997, and provisional application No. 60/048,331, filed on May 30, 1997.

(51) Int. Cl.[7] .................................................. G06F 13/00
(52) U.S. Cl. .................... 709/217; 709/201; 709/203; 709/218; 709/219; 370/110.1; 370/352; 370/389; 370/379; 379/201; 379/207; 379/211; 707/10; 455/432
(58) Field of Search ................... 370/110.1, 352, 370/389, 379; 455/432; 709/200–201, 202, 203, 219, 217, 218; 379/201, 207, 211; 707/10; 700/227

(56) References Cited

U.S. PATENT DOCUMENTS

| | | | |
|---|---|---|---|
| 5,283,829 | | 2/1994 | Anderson ............................... 380/24 |
| 5,495,484 | * | 2/1996 | Self et al. ............................. 370/338 |
| 5,521,363 | * | 5/1996 | Tannenbaum ......................... 235/379 |
| 5,572,583 | * | 11/1996 | Wheeler et al. ...................... 379/207 |
| 5,734,831 | * | 3/1998 | Sanders ........................... 709/200.23 |
| 5,742,762 | * | 4/1998 | Scholl et al. .......................... 709/200 |
| 5,867,495 | * | 2/1999 | Elliot et al. ........................... 370/352 |
| 5,870,558 | * | 2/1999 | Branton, Jr. et al. ........... 709/200.24 |
| 6,047,179 | * | 4/2000 | Kirby .................................... 445/432 |

FOREIGN PATENT DOCUMENTS

| | | | |
|---|---|---|---|
| 9525396 | 9/1995 | (WO) . | |
| 9615505 | 5/1996 | (WO) . | |
| 9615616 | 5/1996 | (WO) | .......................... H04M/15/00 |
| 9641287 | 12/1996 | (WO) | ............................. G06F/17/60 |
| 9714108 | 4/1997 | (WO) | ............................. G06F/17/60 |
| 9714238 | 4/1997 | (WO) | ............................. H04L/12/46 |

OTHER PUBLICATIONS

Low, C., "The Internet Telephony Red Herring,"*Hewlett Packard*, May 15, 1996, pp. 1–15.

Kabay, S. et al., "The Service Node—An Advanced IN Services Element,"*BT Technology Journal*, Apr. 1995, pp. 64–72.

Cancer, Emilio, et al., "IN Rollout in Europe,"*IEEE Communications Magazine*, Mar. 1993, pp. 38–47.

* cited by examiner

*Primary Examiner*—Viet D. Vu
*Assistant Examiner*—Hieu C. Le
(74) *Attorney, Agent, or Firm*—Baker Botts L.L.P.

(57) ABSTRACT

A web interface system (10) for a debit card service in a telecommunications network includes at least one service logic program (28) implementing the debit card service expressed in a web browser readable format, and a web server (30) adapted to store the at least one service logic program (28) and provide access thereto, in the form of at least one web page, by users via a web browser (36). A call scripting process (54) residing in the web server (30) continuously receives user inputs (52) entered on the at least one web page (34) and communicates the user inputs (52) to a predetermined node in the telecommunications network.

21 Claims, 5 Drawing Sheets

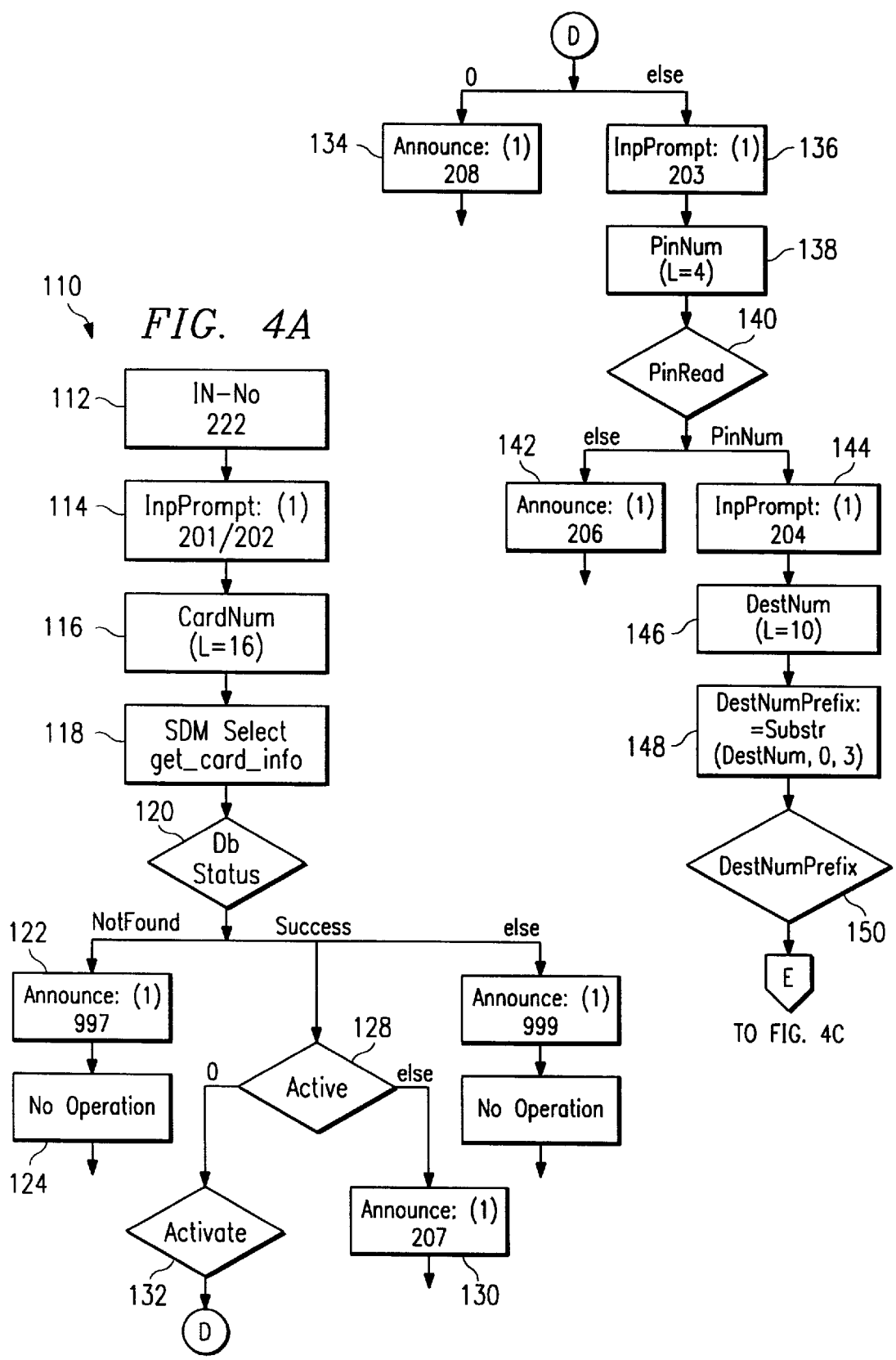

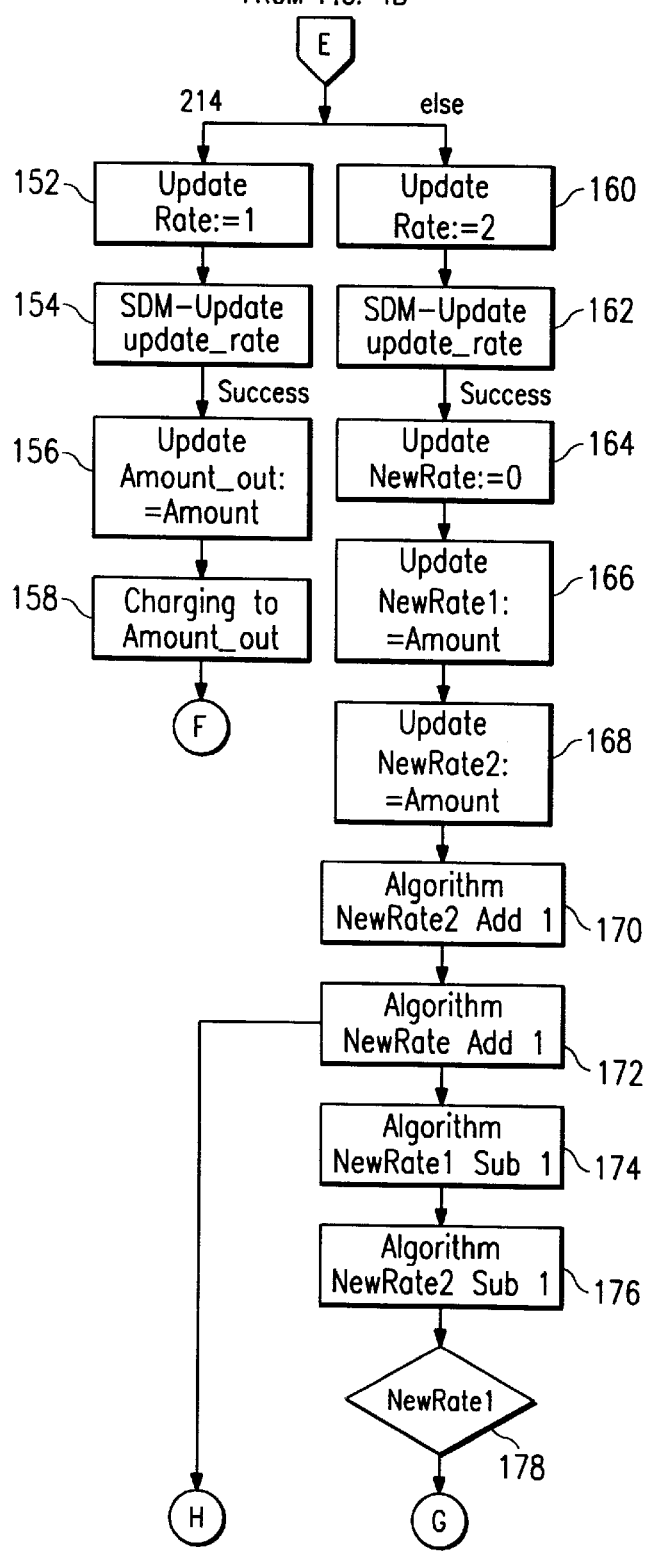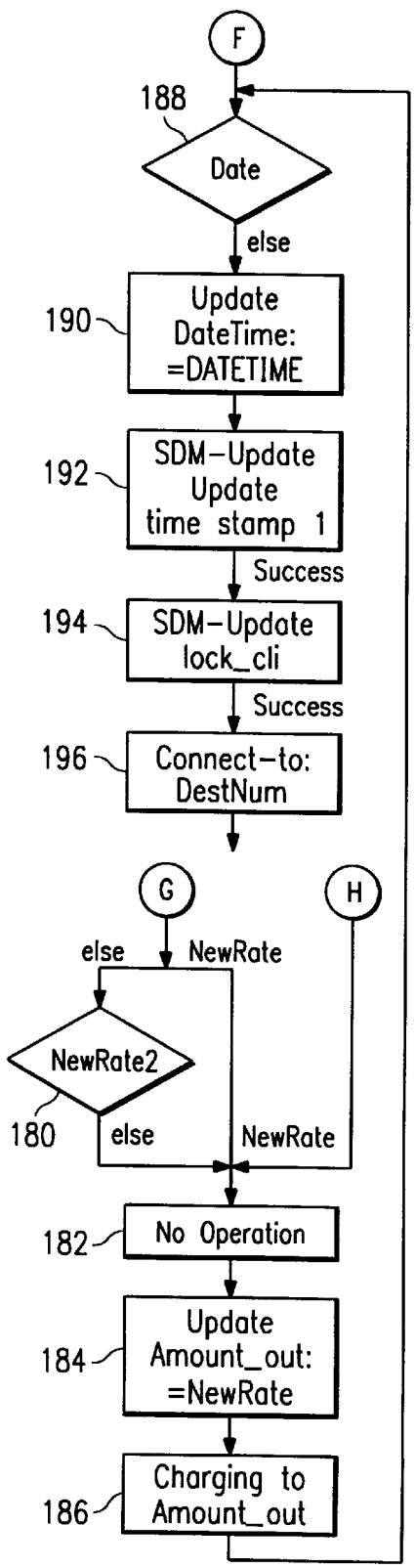
FIG. 4C
FIG. 4D

SYSTEM AND METHOD FOR A DEBIT CARD TELECOM SERVICE

RELATED PATENT APPLICATIONS

This patent application claims the benefit of U.S. provisional applications Ser. No. 60/048,227 entitled System and Method for a Debit Card Telecom Service, filed on May 30, 1997, and Ser. No. 60/048,331 entitled World Wide Web Interface to Telecom Service Creation Environment, filed on May 30, 1997.

This patent application is also related to co-pending U.S. application Ser. No. 08/918,383, entitled World Wide Web Interface to Telecom Service Creation Environment, filed on Aug. 26, 1997, incorporated herein by reference.

TECHNICAL FIELD OF THE INVENTION

This invention is related in general to the field of telecommunications equipment. More particularly, the invention is related to a system and method for a debit card telecom service.

BACKGROUND OF THE INVENTION

With the advent of the Advanced Intelligent Network (AIN), many new telecommunications services have become available. These new services may include free phone, calling card, virtual net, follow me, fully flexible routing, and debit card. These services are typically defined in a service creation environment (SCE) node in the Advanced Intelligent Network by the service provider and then disseminated to the rest of the network for execution. Many of these new services provide added flexibility and convenience in how we may use our telephone equipment. However, after a customer subscribes to a new service, changes or updates to service parameters are typically done by the service provider customer support personnel who has access to the service creation environment. As a result, the service subscribers or users cannot easily update the service parameters to maximize the benefits of the services they subscribe to.

The debit cards service is an especially appealing service because debit cards have become a popular alternative for consumers who desire to be more financially disciplined and yet still enjoy the convenience of a credit card. The debit card draws on funds previously deposited in an account by the card owner and therefore does not carry the danger of putting the card owner in debt with over spending. Further the card issuer is not exposed to bad debts that cannot be collected. For consumers with bad credit history, debit cards provide the possibility of paying for goods and services without cash.

SUMMARY OF THE INVENTION

Accordingly, it has become desirable to offer a debit card service to telephone service subscribers. Further, it is desirable to provide a system that enables the subscriber to easily change the service parameters of the account via the World Wide Web or Internet.

In one aspect of the invention, a web interface system for a debit card service in a telecommunications network includes at least one service logic program implementing the debit card service expressed in a web browser readable format, and a web server adapted to store the at least one service logic program and provide access thereto, in the form of at least one web page, by users via web browsers. A call scripting process residing in the web server continuously receives user inputs entered on the at least one web page and communicates the user inputs to a predetermined node in the telecommunications network.

In another aspect of the invention, a method for providing a web interface to a service creation environment for implementing a debit card service is provided. The invention includes the steps of generating a service data file describing the debit card service, constructing at least one web page in a web browser readable format from the service data file for displaying information therein, and prompting for and receiving a debit card number and a personal identification number on the at least one web page. The debit card number and personal identification number are communicated to the service creation environment.

BRIEF DESCRIPTION OF THE DRAWINGS

For a better understanding of the present invention, reference may be made to the accompanying drawings, in which:

FIGS. 4A–4D are representative of an exemplary service logic program for debit card service call connection according to an embodiment of the present invention.

DETAILED DESCRIPTION OF THE INVENTION

Figure 1:
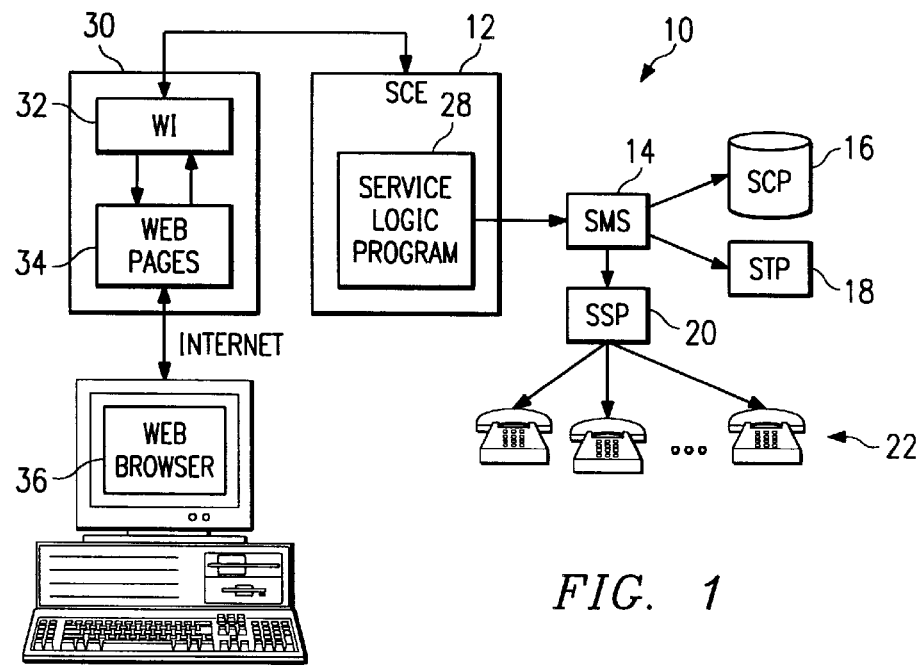
FIG. 1 is a simplified block diagram of the creation and execution environment of a debit card service according to an embodiment of the present invention.

The preferred embodiment(s) of the present invention is (are) illustrated in FIGS. 1–5, like reference numerals being used to refer to like and corresponding parts of the various drawings.

Referring to FIG. 1, the creation and execution environment of a debit card service 10 is shown. A service creation environment 12 is a network node or component of an advanced intelligent network (AIN), which also includes a service management system (SMS) 14, a service control point (SCP) 16, a signal transfer point (STP) 18, and a service switching point (SSP) 20, which is connected to a plurality of customer premise equipment 22 of telephone service subscribers.

Service creation environment 12 is used to create a service logic program 28 which describes the logic flow of telecommunications services such as premium rate, free phone, calling card, virtual net, fully flexible routing, and debit card. A web server 30 with a database may be used to store service logic programs 28 and data associated therewith.

Premium rate service translates a dialed number into a network routing address after verification that the dialed number is not blocked from the call originator. The caller is then connected to the translated number and charges are billed to the caller. Free phone is a service that translates a dialed number into a network routing address, which is dependent on the first three digits of the calling party number, the day of the week, the time of day, and the specific network numbers designated by the service subscriber. The charges for the call are billed to the called party. The calling card service allows a user to enter a card number, an optional personal identification number, and destination number from the caller. The call is then completed to the collected destination number and billed to the account specified by the card number. The virtual net service gives a group of callers the perception of a private dialing plan, but public facilities owned by the network provider are used to route and connect calls. The caller dials a public access number, and a number of digits, which may be a private numbering plan (PNP) extension, a feature access code plus remaining digits, or an offnet access code plus a public number. The follow me service rolls telephone calls to a first destination number to be rolled over to a second destination number. The user may use the setup service to specify the second destination number, the number of rings at the first destination number before rolling over the call, set the time of day and day of week for the roll over telephone calls, etc. The fully flexible routing service is used to route calls to different locations depending on predefined variables. The calls may be routed depending on whether the call occurs on a weekday or during the weekend and whether the call originates from a local telephone. The call may also be routed depending on user input and the time of day. The debit card service allows a user to deposit a certain amount of funds into an account and to deduct the telephone call charges from the available funds in the account. The debit card service may be setup with an account number, add to or specify the amount of funds in the account, and activate or deactivate the service.

Coupled to service creation environment 12 is a web server 30 which includes a web interface (WI) 32 and at least one web page 34 constructed by one or more java applets or programs. Web interface 32 receives a service logic description from service creation environment 12 that describes the service and provides it to the java applets to be displayed in the form of web pages 34. Web pages 34 are downloaded to a web browser 36 running on a user computer. By stepping through a sequence of web pages, the user may enter and change service parameters. The user inputs are communicated back to web server 30 and sent to service creation environment 12 via web interface 32. The user inputs are then communicated to the network nodes, including service control point 16 to update the data stored therein and to service switching point 20 so that it may act in response to the user inputs.

Figure 2:
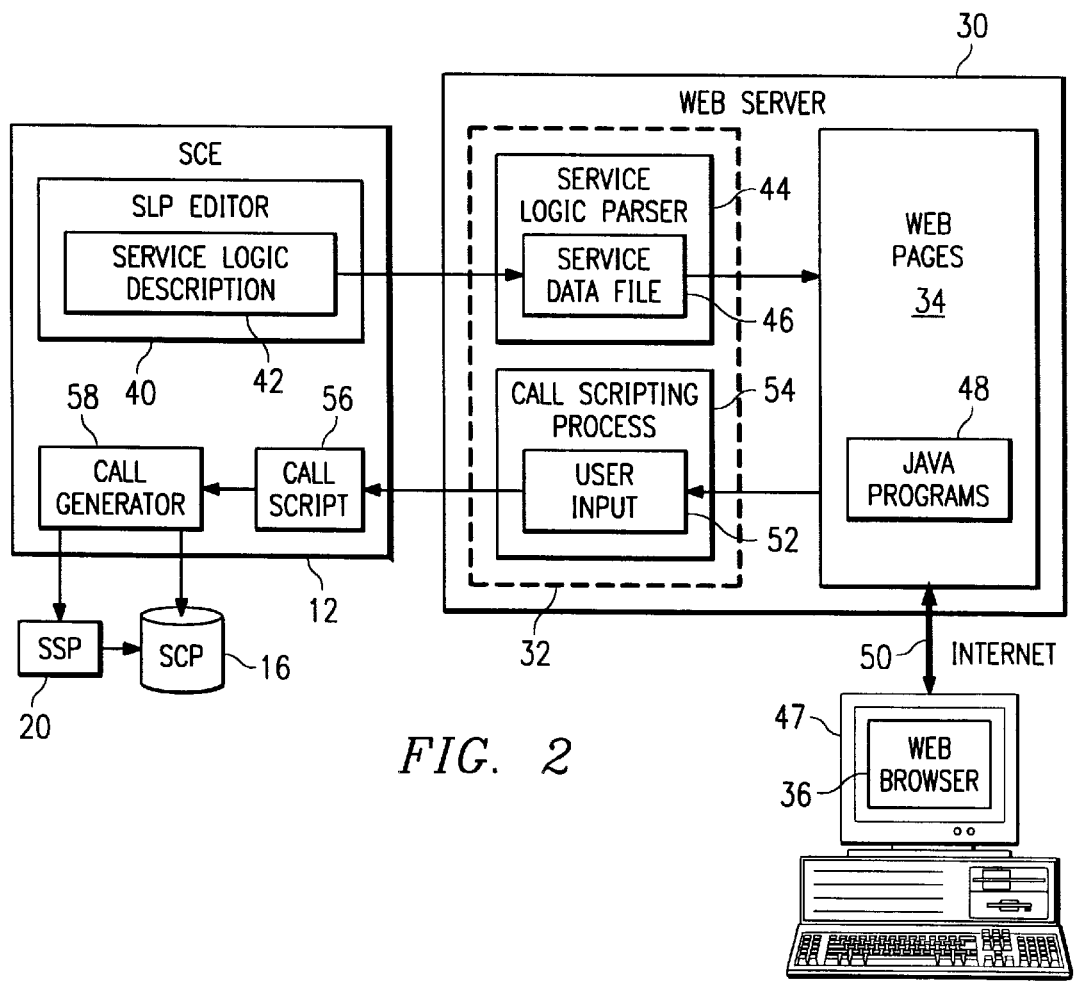
FIG. 2 is a more detailed block diagram of the creation and execution environment of a debit card service according to an embodiment of the present invention.

FIG. 2 is a simplified block diagram of web interface 32 to service creation environment 12. Service creation environment 12 includes a service logic program (SLP) editor 40, which is used to create a service logic description file 42 that describes the logic flow of a service. Service logic description 42 is provided, downloaded or otherwise communicated to web server 30. A service logic parser 44 of web interface 32 receives and parses service logic description file 42, and creates a service data file 46 therefrom in a web browser readable format, such as hypertext markup language (HTML). Service logic parser 44 may be coded in a scripting language such as practical extraction and report language (PERL) using the common gateway interface (CGI) standard. One or more java programs or applets 48 may be used to define the web page formats within which the HTML service data file 44 is displayed. In this manner, web pages 34 provide a graphical interface to the user and prompt the user for input used to setup, activate, deactivate, and update telecommunications services the user subscribes to. Note that java is an exemplary programming language that may be used to construct the web pages and read the HTML service data files, but other languages may also be used.

A user using a web browser 36 executing on a computer, workstation, telephone, or some other device 47 may download web pages 34 along with java programs 48 over the Internet 50. Web pages 34 display decision options, telephone keypads, and associated information to solicit and receive user input regarding service updates and changes. User inputs 52 entered via each web page 34 are received by web browser 36 and communicated back to web server 30 over the Internet 50. User inputs 52 are then continuously provided to a call scripting process 54 residing on web server 30 that reformats the user inputs and generates a call script file 56 therefrom. Call script file 56 is then transmitted to service creation environment 12. A call generator 58 residing in service creation environment 12 continuously looks for call script file 56 in predetermined locations in memory, and once one is found, sends it to service switching point 20 for execution and/or to service control point 16 to update the service data stored therein. Alternatively, service switching point 20 may serve as an intermediary and communicate the update data to service control point 16. Thereafter, call generator 58 then deletes call script file 56 from memory and continues looking for the next call script file 56.

As described above, each service created and defined in service creation environment 12 has a service logic description 42 which contains all the information about the service's parameters and run format. Service logic descriptions 42 preferably follow a predefined format so that they may be correctly read and parsed by service logic parser 44. Identifiers or keywords are used in service logic descriptions 42 to identify the lines of text therein. Exemplary identifiers are listed as follows:

SERVICE name of service

TRIGGER number sent to service switching point to start running the service

DECISION name of page

BUTTON creates a button and the associated text

Figure 3A:
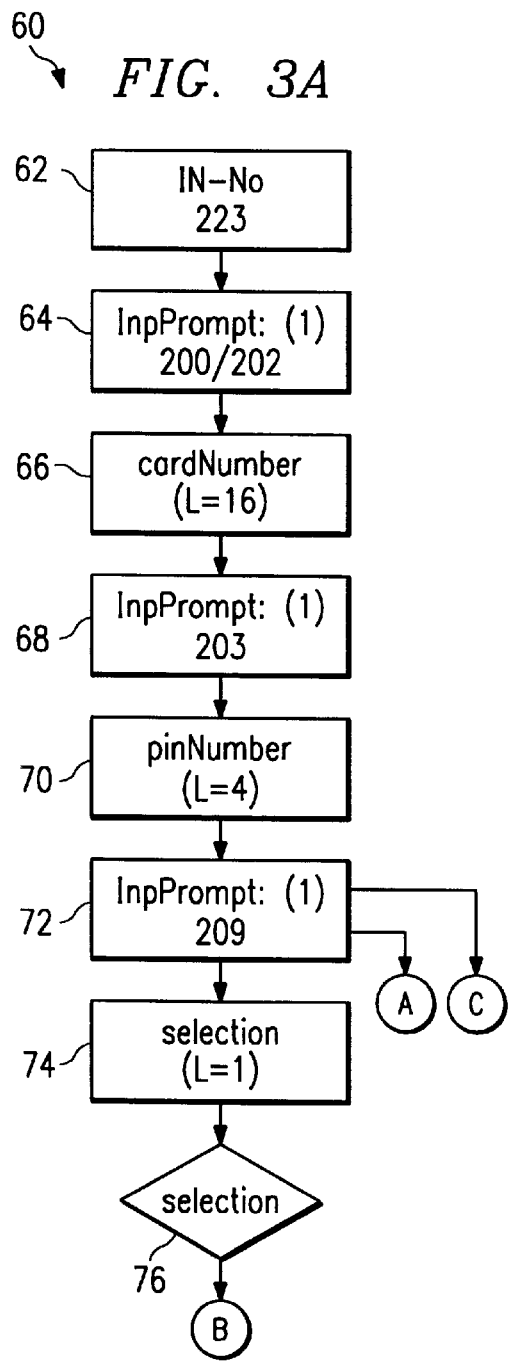
FIGS. 3A–3B are representative of an exemplary service logic program for debit card service set up according to an embodiment of the present invention.
Figure 3B:
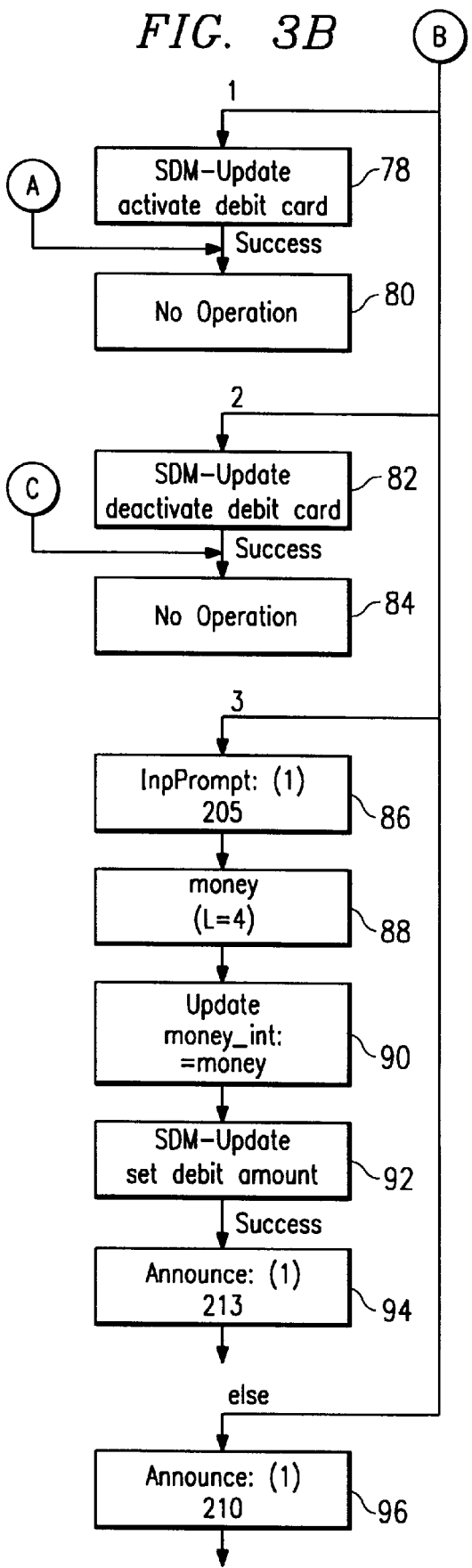

LENGTH display phone keypad page and specify the character length of requested user input CODE display phone keypad page and specify the exact input required from the user → specify the next page name (specified by DECISION) to be displayed after a certain user input, e.g. LENGTH, CODE, BUTTON Referring to FIGS. 3A–3B, an exemplary service logic program 60 used to set up a debit card service is shown. An entry service independent block (SIB) 62 is used to indicate the entry point for the service logic program and identifies the trigger, 223 for example, sent at the start of the service. An announcement is made to the caller in SIB 64, which prompts the caller to enter a debit card number which is received in SIB 66. In SIB 68, an announcement further prompts the user to enter a personal identifier number (PIN) which is received in SIB 70. A third announcement then prompts the user to enter a 1, 2, or 3 to select between activating the debit card, deactivating the credit card, or specify the amount of funds in the account, respectively, in SIB 72, which is received in SIB 74. If the user input is determined in decision SIB 76 is a "1", then in SIB 78 a database update occurs to set a variable or flag associated with the debit card account in the database to activate the debit card. Then in SIB 80 the process returns to SIB 72 to allow the caller to select another option. If in SIB 76 the caller enters a "2", then in SIB 82 the activate variable or flag is updated to deactivate the debit card account. SIB 84 then returns the process to SIB 72 for another selection. If in SIB 76 the caller enters a "3", an announcement is played in SIB 86 to prompt the caller to enter a four digit numeral (L=4) representing a dollar amount for the amount of available funds in the account, which is received in SIB 88. The entered digits are converted to an integer numeral in SIB 90 and the database is updated with this amount in SIB 94. An announcement is then played in SIB 94 to inform the completion of debit card service setup, which concludes the service logic program. If the caller input is anything other than 1, 2, or 3, then an announcement is played to inform the caller to either try again, for example.

FIGS. 4A–4D are representative of an exemplary service logic program 110 for connecting a debit card call. Entry SIB 112 specifies the trigger, 222 for example, for the start of the service. In SIB 114, an announcement is made to prompt the caller to enter a 16-digit debit card number which is received in SIB 116. In response to the debit card number received from the caller, information associated with the debit account is retrieved from the database in SIB 118. If the debit card number or the data associated therewith cannot be located in the database, then an appropriate announcement is played to the caller in SIB 122 and the service concludes in SIB 124. If data retrieval from the database is successful, then a retrieved active variable or flag is checked to determine if the card is currently in use in SIB 128. If the value of the variable indicates that a telephone call is currently connected using the funds from this debit card account, then an announcement is played to the caller in SIB 110 and the process concludes. Alternatively, provisions may be made to allow a fixed number of calls to be simultaneously made from a single account, if desired.

If the debit account is not currently active, then in decision SIB 132 a determination is made as to whether the debit card account has been activated. If not, then an appropriate announcement is made in SIB 134 to inform the caller. If the debit account has been activated, then the user is prompted in SIB 116 to enter the 4-digit personal identification number, which is received in SIB 138. If the received personal identification number is not correct, an appropriate announcement is played in SIB 142. If the personal identification number is correct, then an announcement is played in SIB 144 to prompt for a destination number, which is received in SIB 146. In SIB 148, the destination area code is checked to determine if it is a local number or long distance number. If the area code is 214, for example, as determined in SIB 150, then SIBs 152–158 determine the per minute rate that will be charged to the call. If the area code is anything other than 214, for example, then SIBs 160–186 determine the per minute rate that will be charged to the long distance call. In this example, the long distance rate is twice the rate charged for a local call. After the rate is determined, the current date and time is obtained in SIB 188 and a variable is set to the current date and time obtained in SIB 190. The database is then updated with the current date and time stamp in SIB 192. In SIB 194, the origination telephone circuit is "locked" and the caller is connected to the destination number in SIB 196.

Figure 5A:
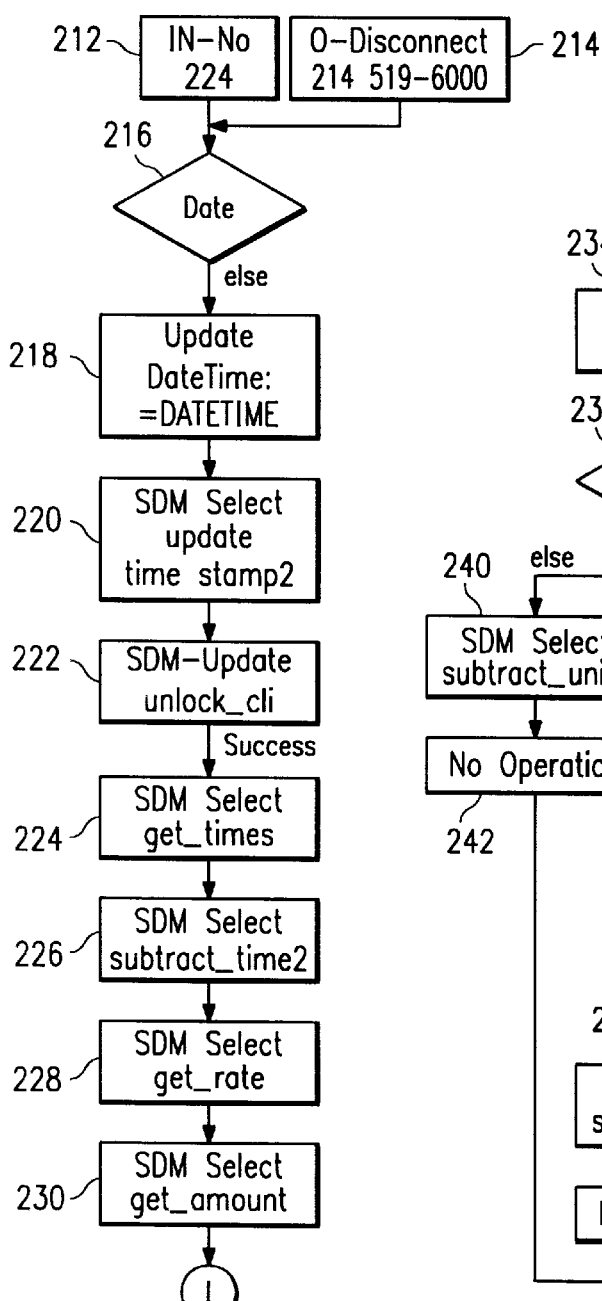
FIGS. 5A–5B are representative of an exemplary service logic program for debit card service call disconnection according to an embodiment of the present invention.
Figure 5B:
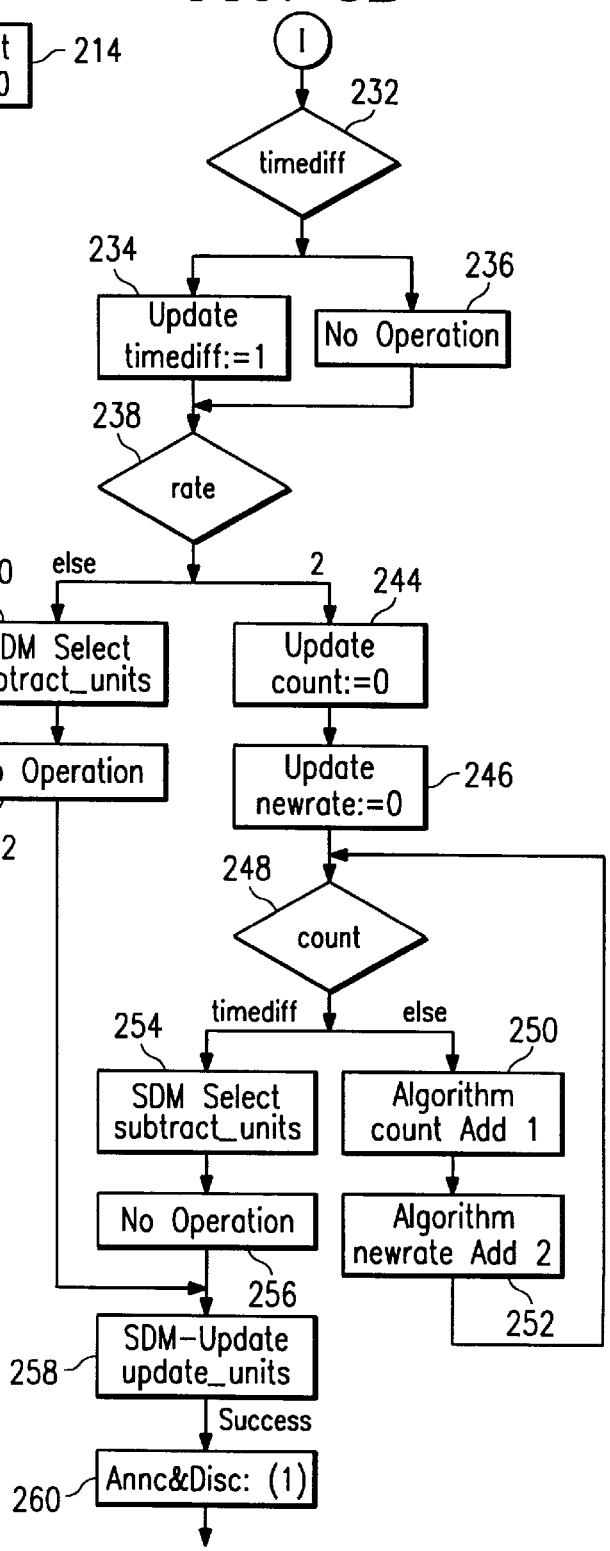

FIGS. 5A and 5B are representative of an exemplary service logic program 210 that provides the call disconnection sequence for a debit card call. An entry SIB 212 provides an entry point and the trigger, 224 for example, for the service logic program. Alternatively, another entry point is available from SIB 214, which is initiated upon an on-hook event. In SIBs 216 and 218 the current date and time is obtained, which is the time that the telephone call ended. The current time is used to update a second time stamp variable in SIB 220. In SIB 222 the telephone circuit is unlocked to make it available to make or take another call. In SIBs 224 and 226, the time difference between the two time stamps, which is the call duration, is computed. The per minute rate is obtained from the database in SIB 228 and the amount of funds available in the account is obtained from the database in SIB 230. In decision SIB 232, it is determined whether the time difference between the time stamps or the call duration is zero or less than a minute; if so, in SIB 234 the time difference is set to equal one minute so that the minimum call duration is one minute. If the call duration is not zero, then no operation is performed as in SIB 236. In decision SIB 238, it is determined if the rate for the call is long distance or local. If the call was local, then the amount of funds in the debit account is subtracted by the charge for the telephone call in SIBs 240 and 242. If the call was long distance where the rate was twice that of a local call, then SIBs 250–256 in effect multiplies the number of minutes or units for the call duration by two to compute for the total charge for the call, which is then subtracted from the funds in the account. In SIB 258, the amount of funds in the debit account is updated. SIB 260 provides for an announcement which may be used to provide a feedback to the caller of the remaining funds in the account, for example.

From the foregoing, web server 30 may store the following information associated with each debit account: debit card number, personal identification number, the amount of funds in the account, account active variable, account activated/deactivated variable, start time stamp, stop time stamp, locked/unlocked circuit, and per minute rate for the call.

Web interface 32 receives the debit card service setup and runtime execution logic programs from service creation environment 12 and generates hypertext markup language (HTML) representations thereof. Exemplary HTML files for the debit card services are shown below:

---
debit_card.html

```
<HTML>
<HEAD>
<title>Debit Card Service</title>
</HEAD>
<BODY>
<APPLET code="newsim.class" width=550 height=390>
<PARAM NAME=Service_Name VALUE="Debit Card ">
<PARAM NAME=Trigger VALUE=222>
<PARAM NAME=header1 VALUE="Enter Credit Card Number">
<PARAM NAME=length1 VALUE=16>
<PARAM NAME=code1 VALUE=1234567887654321>
<PARAM NAME=next1_1 VALUE="Please Enter Your PIN Code">
<PARAM NAME=header2 VALUE="Please Enter Your PIN Code">
<PARAM NAME=length2 VALUE=4>
<PARAM NAME=code2 VALUE=1234>
<PARAM NAME=next2_1 VALUE="Please Enter Destination Number">
<PARAM NAME=header3 VALUE="Please Enter Destination Number">
<PARAM NAME=length3 VALUE=10>
<PARAM NAME=next3_1 VALUE="Your Phone Call is being completed">
<PARAM NAME=header4 VALUE="Your Phone Call is being completed">
</APPLET>
</BODY>
</HTML>
```
---

The HTML files are then read by the java programs in web server 30 to construct web pages 34, which are downloaded to web browsers to be accessed by users.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A web interface system for a debit card service in a telecommunications network, comprising:
   at least one service logic program implementing the debit card service expressed in a web browser readable format;
   a web server adapted to store the at least one service logic program and provide access thereto, in the form of at least one web page, by users via web browsers; and
   a call scripting process residing in the web server and adapted to continuously receive user inputs from a subscriber entered on the at least one web page and continuously communicate the user inputs to a predetermined node in the telecommunications network, wherein the user inputs include information to enter and change service parameters of the debit card service subscribed to by the subscriber.

2. The web interface system, as set forth in claim 1, further comprising a service logic parser residing in the web server and adapted to receive a service logic program from a service creation environment in the telecommunications network, parse the service logic program and generate a web browser readable service data file.

3. The web interface system, as set forth in claim 2, further comprising a call generator residing in the service creation environment adapted to continuously receive the user inputs from the call scripting process and continuously communicate the user inputs to a service control point for database update.

4. The web interface system, as set forth in claim 1, wherein the at least one debit card service logic program comprises:
   a service logic program adapted to set up a debit card service;
   a service logic program adapted to connect a debit card call; and
   a service logic program adapted to disconnect the debit card call.

5. The web interface system, as set forth in claim 4, wherein the debit card service set up logic program comprises at least one web page requesting the user to enter a debit card number and a personal identification number.

6. The web interface system, as set forth in claim 4, wherein the debit card service set up logic program comprises at least one web page requesting the user to select from an option to activate the debit card service, an option to deactivate the debit card service, and an option to enter the amount of funds in a predetermined debit card account.

7. The web interface system, as set forth in claim 4, wherein the debit card service logic program comprises at least one web page requesting the user to enter a debit card number and a personal identification number.

8. The web interface system, as set forth in claim 7, wherein the debit card service call connection logic program comprises at least one service independent block adapted to verify the debit card number and personal identification number.

9. The web interface system, as set forth in claim 4, wherein the debit card service call connection logic program comprises at least one web page requesting the user to enter a destination number.

10. The web interface system, as set forth in claim 9, wherein the debit card service call connection logic program comprises at least one service independent block adapted to determine a per minute rate charge in response to receiving the destination number.

11. The web interface system, as set forth in claim 10, wherein the debit card service call connection logic program comprises:
    at least one service independent block adapted to determine a call start time; and
    at least one service independent block adapted to connect the user to the destination number.

12. The web interface system, as set forth in claim 10, wherein the debit card service call disconnection logic program comprises:
    at least one service independent block adapted to disconnect the user from the destination number;
    at least one service independent block adapted to determine a call duration;
    at least one service independent block adapted to determine a charge for the debit card call; and
    at least one service independent block adapted to subtract the charge from an amount of funds in predetermined debit card service account.

13. The web interface system, as set forth in claim 2, further comprising a call generator residing in the service creation environment adapted to continuously receive the user inputs from the call scripting process and continuously communicate the subscriber inputs to a service switching point for execution.

14. A method for providing a web interface to a service creation environment for implementing a debit card service, comprising the steps of:
    generating a service data file describing the debit card service;
    constructing at least one web page in a web browser readable format from the service data file for displaying information therein;
    prompting for and receiving user inputs from a subscriber including a debit card number and a personal identification number on the at least one web page; and
    continuously communicating the user inputs including the debit card number and personal identification number to the service creation environment in order to effectuate a change in service parameters of the debit card service subscribed to by the subscriber.

15. The method, as set forth in claim 14, further comprising the step of downloading the at least one web page to a user device for displaying the at least one web page and receiving the debit card number and personal identification number thereon.

16. The method, as set forth in claim 14, further comprising the steps of:
    executing a web browser on a user device; and
    downloading the at least one web page to the user device for displaying the at least one web page and receiving the debit card number and personal identification number thereon.

17. The method, as set forth in claim 14, further comprising the steps of:
    prompting for and receiving a destination number on the at least one web page; and
    communicating the destination number to the service creation environment.

18. The method, as set forth in claim 14, further comprising the steps of:
    prompting for and receiving, on the at least one web page, a user selection between the options of service activation, service deactivation, and identification of account amount; and communicating the user selection to the service creation environment.

19. The method, as set forth in claim 17, further comprising the step of determining a per minute rate charge in response to receiving the destination number.

20. The method, as set forth in claim 19, further comprising the steps of:

computing a call start time; and connecting the user to the destination number.

21. The method, as set forth in claim 20, further comprising the steps of:

disconnecting the user from the destination number;

computing a call duration;

computing a charge for the debit card call; and subtracting the charge from an amount of funds in predetermined debit card service account.

* * * * *